(12) United States Patent
Humphris

(10) Patent No.: US 9,052,340 B2
(45) Date of Patent: Jun. 9, 2015

(54) PROBE ASSEMBLY FOR A SCANNING PROBE MICROSCOPE

(75) Inventor: Andrew Humphris, Abingdon Oxforshire (GB)

(73) Assignee: INFINITESIMA LTD, Oxford (GB)

( * ) Notice: Subject to any disclaimer, the term of this patent is extended or adjusted under 35 U.S.C. 154(b) by 175 days.

(21) Appl. No.: 13/636,216

(22) PCT Filed: Mar. 29, 2011

(86) PCT No.: PCT/GB2011/050646
§ 371 (c)(1),
(2), (4) Date: Sep. 20, 2012

(87) PCT Pub. No.: WO2011/121348
PCT Pub. Date: Oct. 6, 2011

(65) Prior Publication Data
US 2013/0014296 A1    Jan. 10, 2013

(30) Foreign Application Priority Data
Mar. 29, 2010 (GB) ................... 1005252.0

(51) Int. Cl.
*G01Q 70/06* (2010.01)
*G01Q 70/02* (2010.01)
*G01Q 10/02* (2010.01)
*B82Y 35/00* (2011.01)

(52) U.S. Cl.
CPC ............. *G01Q 70/06* (2013.01); *G01Q 10/02* (2013.01); *G01Q 70/02* (2013.01); *B82Y 35/00* (2013.01)

(58) Field of Classification Search
CPC ....... G01Q 10/00; G01Q 10/02; G01Q 70/02; G01Q 70/06
USPC ......... 850/1, 2, 53, 55; 73/105; 977/851, 873, 977/877
See application file for complete search history.

(56) References Cited

U.S. PATENT DOCUMENTS

| | | | |
|---|---|---|---|
| 5,157,256 A | 10/1992 | Aaron | |
| 5,412,597 A * | 5/1995 | Miyazaki et al. | 369/126 |
| 5,418,771 A * | 5/1995 | Kasanuki et al. | 369/126 |
| 5,705,814 A | 1/1998 | Young et al. | |
| 6,028,305 A | 2/2000 | Minne et al. | |

(Continued)

FOREIGN PATENT DOCUMENTS

| | | |
|---|---|---|
| DE | 10110933 A1 | 11/2001 |
| JP | 6195768 A | 7/1994 |
| WO | 03062742 A1 | 7/2003 |

OTHER PUBLICATIONS

Search Report corresponding to GB1005252.0, dated Jul. 22, 2010.

(Continued)

*Primary Examiner* — Jack Berman
(74) *Attorney, Agent, or Firm* — Lowe Hauptman & Ham, LLP

(57) ABSTRACT

A probe assembly for use with a scanning probe microscope includes a carrier supporting at least two probes mounted on a tilt stage arranged to tilt the carrier about an axis. The probes may be distributed on one or more surfaces. In use, the tilt stage operates either as a selection device, orienting a selected probe or surface towards a sample, and/or as an alignment tool, adjusting a planar array of probes such that they are better aligned with the sample. This offers the potential for automated exchange of probes, with increased speed and accuracy, during microscope operation.

5 Claims, 13 Drawing Sheets

(56) References Cited

U.S. PATENT DOCUMENTS

| | | | |
|---|---|---|---|
| 6,196,061 | B1 | 3/2001 | Adderton et al. |
| 6,667,467 | B2 | 12/2003 | Shimizu et al. |
| 7,597,717 | B1 | 10/2009 | Lu et al. |
| 8,261,662 | B1 * | 9/2012 | Shile et al. .................. 101/327 |
| 2003/0020500 | A1 | 1/2003 | Altmann et al. |
| 2003/0068446 | A1 * | 4/2003 | Mirkin et al. ............. 427/430.1 |
| 2009/0138994 | A1 | 5/2009 | Kawakatsu |

OTHER PUBLICATIONS

International Search Report corresponding to PCT/GB2011/050646, dated Jul. 12, 2011.

Seunghun Hong et al., "A Nanoplotter with Both Parallel and Serial Writing Capabilities", Science, American Association for the Advancement of Science, Washington, D.C., vol. 288, No. 5472, pp. 1808-1811, Jun. 9, 2000.

* cited by examiner

PROBE ASSEMBLY FOR A SCANNING PROBE MICROSCOPE

RELATED APPLICATIONS

The present application is a National Phase of International Application Number PCT/GB2011/050646, filed Mar. 29, 2011, and claims priority from British Application Number 1005252.0, filed Mar. 29, 2010.

This invention relates to the field of scanning probe microscopes and, specifically, to an assembly in which the probes for use in such microscopes are held and manipulated.

The principle behind the scanning probe microscope (SPM) is to obtain a map or image of a sample surface by monitoring the interaction between the sample surface and a probe tip that is positioned in close proximity. By mechanically scanning the tip over the sample surface, data characterising the interaction over an area of interest may be collected and a map or image generated.

A particular example of the SPM is the atomic force microscope (AFM) in which the force interaction between the sample and the sharp tip of a probe is monitored. The probe of a typical AFM includes a small cantilever that is fixed to a support at its base and with the tip at its opposite (free) end. When the probe tip is brought into close proximity with the sample, an interaction force develops between sample and tip. If the tip is in motion, for example oscillating, the interaction force will modify this motion in some way. If the tip is static, the force will displace the tip relative to the sample surface.

During the course of a scan, the strength of the interaction between tip and sample surface will change as the characteristics of the surface beneath the probe tip change. A three axis (xyz) high-resolution scanner typically generates relative motion between the sample and the probe, driving either the sample and/or probe support. The scanner may be a single integrated unit or it may comprise separate actuators or groups of actuators. For example, some AFMs employ a combined x, y direction actuator to move the sample and a separate z actuator to move the probe. Conventionally, the xy plane is taken to correspond generally with that of the sample and the z or vertical direction is taken to be that in which the separation between probe and sample may be adjusted.

Scanners typically employ piezoelectric stack or tube actuators. These actuators are based on applying a voltage to a piezoelectric material to generate movement, which may be guided using mechanical flexures. Alternative scanners, such as those described in WO 02/063368 and WO 2004/005844, utilise the motion of a mechanically resonating structure to generate one or more components of the xy scan.

The effect of the interaction force on either the position and/or motion of the probe tip is monitored during the course of the scan. In conventional AFM operation, the monitored interaction force is held constant. That is, its effect on the probe is observed and a feedback system operates to adjust the separation of the sample and the base of the probe in response to any change so as to return the observed parameter to a predetermined value: the set point of the feedback system. Data associated with this adjustment (conventionally, vertical or "z" movement) is collected and may be used to construct a map or image of the sample across a region of its surface.

AFMs may be designed to operate in a variety of imaging modes. In contact mode the probe continuously remains in close proximity or in contact with the sample. In dynamic (intermittent contact or non-contact) mode the probe is oscillated, bringing it periodically into close proximity or contact with the sample.

If a static tip is used then changes in the interaction force are monitored during the course of a scan via the bending or deflection of the cantilever. As the interaction force between tip and surface changes, the tip moves either towards or away from the surface. This tip movement is communicated to the cantilever part of the probe, which accordingly bends or flexes along its length.

The deflection of the cantilever is typically monitored with an optical lever system. Deflection, in this context, refers to the tilt of an upper surface of the probe, which is used by the AFM to provide an indication of cantilever bend. A light beam is directed towards the upper surface of the probe, above its tip, and reflected towards a position sensitive detector such as a photodiode with two or four segments, as is well known in the art. Many sources may be used to generate the light beam. Typically, a laser diode emitting visible or infrared radiation is used. Alternatively, a He Ne laser, superluminescent diode (SLD), LED or other light source whose emitted beam is capable of being collimated and/or focused to a spot may be used.

Alternatively, the AFM may be operated in dynamic mode. The probe is oscillated, often at or near one of its resonant frequencies, and variations in the sample-probe interaction affect the motion of the probe. In particular, the amplitude, phase and frequency of these oscillations may be monitored and probe-sample separation adjusted in order to maintain constant average interaction.

The use of an oscillating probe means that the probe is only intermittently brought into close proximity or contact with the sample. This has the effect of reducing lateral forces between tip and sample surface. In contact mode lateral forces developed as the probe is moved across the surface may, if imaging soft materials such as biological samples or polymers, destroy the sample surface. Any measurements taken will be rendered meaningless, or at least relate to a deformed surface. These lateral forces may also be destructive of a fragile probe tip. An example of a fragile tip is one with a high aspect ratio i.e. one with a long length relative to its width that is used to probe narrow trenches in sample surfaces. In addition an AFM operating in dynamic mode is often capable of extracting more material-specific information.

The AFM can be configured and used in many different modes. It should be borne in mind that the above description of contact and dynamic modes and of atomic force microscopy is to provide a general introduction to the field of scanning probe microscopy and is not intended to imply any limitation to the field of application of this present invention in any way.

Regardless of their mode of operation, AFMs can be used to obtain images on an atomic scale of a wide variety of samples, insulating and conducting, in a range of environments, air, liquid or vacuum. Typically, they employ piezoelectric actuators, optical lever deflection detectors and very small cantilevers produced using silicon fabrication techniques. Their high resolution and versatility has led to their finding application in diverse fields such as industrial inspection, semiconductor manufacturing, biological research, materials science and nanolithography.

The probe includes a cantilever beam and tip, which is generally (for AFM) fabricated from silicon or silicon nitride. Typically, the cantilever is around 50-200 µm long, 20-50 µm wide and around 0.2 to 2 µm thick, but this size can of course be varied according to application. The shape may also be varied: typically it is rectangular or triangular with, in the latter case, the tip in the vicinity of its apex. The tip is typically 5 µm at its base, 3-10 µm high and with an end radius of curvature of 10-20 nm. In use, the fine point at the end of the tip is oriented towards the sample. Smaller dimension probes, with cantilevers around 5-20 µm long and 3-10 µm wide, have recently been used at faster imaging speeds.

With use, a probe will wear and may become contaminated or damaged, or rendered otherwise unusable. Accordingly, it is, at times, necessary to replace a worn or damaged probe with a new one. The exchange frequency is increased at faster scanning speeds, for example when the probe is used in fast-scan SPMs such as those described in WO 2002/063368 and WO 2004/005844.

In order to address problems posed by increased rates of exchange, WO 2008/053217 describes a probe assembly on which a plurality of probes are mounted. The assembly is mounted on the microscope and a selection system used to address one or more probes and to move the selected probe into position for engagement with the sample. Typically, probe selection is performed by electrostatic or thermal activation to move the selected probe out of a common plane occupied by the remainder of the probes. An alignment system is included to aid automated alignment of the selected probe with the microscope detection system.

Other examples of automated exchange or replacement of probes are also known in the prior art. Such exchange is used variously for collection of complementary information from the sample, for data collection from different samples or to replace a worn probe. These examples of automated exchange mechanism are, generally, one of two types. A probe repository holds unused probes in readiness for selection. Either the repository is external to the microscope, for example that described in U.S. Pat. No. 5,705,814, or the repository, including its multiple probes, is mounted on the microscope, for example U.S. Pat. No. 7,597,717. U.S. Pat. No. 5,705,814 describes a scanning probe microscope with automated probe exchange. The probe mount incorporates clamping means for picking up and holding individual cantilever probes from a repository. The repository is moved to the sample stage when a new probe is to be mounted in the microscope. U.S. Pat. No. 5,157,256 describes a microscope that incorporates a carousel that is used to rotate probes within a carrier to a position from which a selected probe may be transferred for engagement with the sample. U.S. Pat. No. 7,597,717 describes a microscope head in the form of a wheel with cantilever probes arranged around the perimeter. A rotation of the head enables different probes to be rotated into a scanning position.

Prior art mechanisms for exchanging probes from an external repository involve significant mechanical movement of parts. This inherently takes time to accomplish, although it remains faster than manual exchange and removes the need for an operator to be present.

Prior art exchange systems that include the repository on the microscope are often unsuitable for incorporation in fast-scan microscopes in which the need for probe replacement is greatest. The scanning speed of a microscope is limited by the mass that the scanning actuator needs to drive. If the sample is scanned, then the size of the sample is restricted, which severely reduces the flexibility of the microscope. The current preference is therefore to drive the probe. If the probe is part of an exchange assembly of a type taught in the prior art to be mounted on the microscope, then the scanning actuator would be required to drive both the probe array and the exchange mechanism. Implementing automated probe exchange in a fast-scan SPM therefore, whilst it does increase the speed of probe exchange, inevitably reduces the speed at which that SPM can scan a sample. The actual improvement in operating speed may therefore fall some way short of its initial promise Scanning probe microscopes require a precise alignment of probe with the microscope system. Prior art exchange systems simply do not have the control to align the new probe with the degree of accuracy required to exploit the imaging capability of such microscopes. The probe exchange system described in U.S. Pat. No. 7,597,717 for example can only position a replacement probe with an accuracy afforded by the rotation mechanism that drives the wheel. That is, the accuracy of the exchange system is limited by the mechanical accuracy of a macroscopic movement. In order to image accurately at a chosen location, the microscope system requires realignment, somewhat negating the speed increase that is obtained by automating the exchange process.

The probe array described in WO 2008/053217 involves a smaller degree of movement to facilitate probe selection and also has reduced repository size, in comparison with other on-microscope repository systems. This enables a more rapid exchange or replacement of probes, with reduced impact on scanning speed. The requirement to align a probe array with a sample however brings its own complications. Incorporation of multiple probes on an assembly sets stringent limits on fabrication tolerances of the assembly. The fabrication process simply cannot guarantee that all probes are mounted at the same angle, at the same height and in the same orientation. This non-uniformity is particularly severe when the array includes a plurality of different probe types, fabricated by different methods or when a large number of probes are present on the assembly. Current fabrication techniques allow tens to hundreds of probes, depending on probe size and pitch, to be included on a single chip.

It is an object of the present invention to provide a novel adjustment mechanism for probes mounted on an assembly for use with a scanning probe microscope. Ideally such an adjustment mechanism has the flexibility for use in multiple situations. For example it may be used in exchanging one probe for another mounted on the assembly. It may alternatively be used to ensure accurate alignment of an array of probes that is less sensitive to alignment errors arising during the fabrication process than known in the prior art.

Accordingly the present invention provides a probe assembly for use with a scanning probe microscope, the assembly comprising a carrier supporting at least two probes mounted on a tilt stage arranged to tilt the carrier about an axis. Aspects of this invention provide variously a method of registering the probe assembly such that the orientation of the carrier is determined accurately in preparation for exchange; an arrangement within the assembly that enables the mass driven by a scanning actuator to be reduced; and a novel design of tilt stage that enables small displacements to be made with improved accuracy.

A tilt stage is a platform that presents a support surface or surfaces on which one or more objects are to be mounted. The platform is connected to an adjustment mechanism that enables a "tilting" motion about at least one axis, the axis being generally parallel to the surface or to one of the surfaces. This enables the orientation of the surface or surfaces with respect to an external plane (in this instance, that of the sample) to be adjusted.

By including the tilt stage with the assembly, the carrier can be adjusted at or near to its scanning position within the microscope. This reduces the movement required when exchanging or replacing one probe with another. This more limited movement can be accomplished with greater accuracy than known in the prior art, reducing the time spent in aligning a new probe with the microscope system. In some situations it may not be necessary even to effect realignment after exchange. A mechanism in accordance with this invention also enables an in situ adjustment of carrier and hence probe orientation that may be used in situations in which fabrication techniques are not sufficiently accurate to ensure correct probe alignment on the carrier.

In a first aspect therefore, the present invention provides a method of preparing a probe assembly for use with a scanning probe microscope, the assembly comprising a carrier supporting at least two probes mounted on a tilt stage arranged to tilt the carrier about an axis, the method comprising the step of optically determining the orientation of the carrier. The orientation of the carrier may be determined by measuring the relative heights of the at least two probes, or by measuring their relative angle to a predetermined plane.

In a second aspect, the present invention provides a probe assembly for use with a scanning probe microscope, the assembly comprising a carrier supporting at least two probes, a scanning mechanism arranged to move the carrier in a predetermined scanning plane and a tilt stage arranged to tilt the carrier about an axis, wherein the carrier, scanning mechanism and tilt stage are arranged such that the tilt stage is not moveable by operation of the scanning mechanism, which is arranged to drive the carrier. The tilt stage may be arranged to drive both the carrier and the scanning mechanism. The scanning mechanism may include at least one oscillating actuator arranged to drive the carrier at or near its resonant frequency In a third aspect, the present invention provides a probe assembly for use with a scanning probe microscope, the assembly comprising a carrier supporting at least two probes mounted on a tilt stage arranged to tilt the carrier about an axis, the tilt stage comprising a platform that is pivotable about a pivot point and an actuator arranged to apply a force to one side of the platform such that it pivots about said pivot point. The tilt stage preferably includes a kinematic mount.

In another aspect the present invention provides a scanning probe microscope comprising a sample stage; a probe assembly as described above; and a detection system for detecting the position of a probe selected from the probe assembly as it is scanned relative to a sample.

The microscope may be any scanning probe microscope, including an atomic force microscope.

In a third aspect the invention provides a method of studying a sample surface using a scanning probe microscope having a sample plate and a detection system, the method comprising the steps of:

mounting a sample on the sample plate of the scanning probe microscope;

mounting a probe assembly as described above in the scanning probe microscope;

operating the tilt stage to orient the carrier such that a selected probe is oriented towards the sample;

optionally addressing the selected probe to cause its tip to move out of a common plane relative to the remainder of the probes in its vicinity;

positioning the selected probe over the sample surface;

aligning the detection system of the scanning probe microscope with the one or more selected probes;

generating relative movement between the selected probe and the sample surface; and monitoring the response of the one or more probes to its interaction with the sample using the detection system.

Embodiments of the invention will now be described by way of example only and with reference to the accompanying drawings.

Figure 2A:
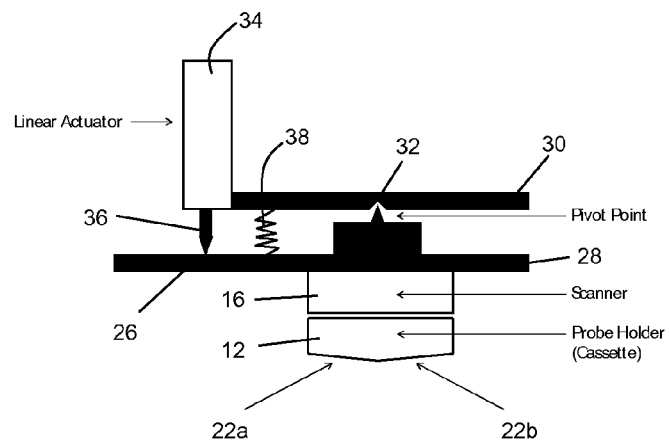
Figure 2B:
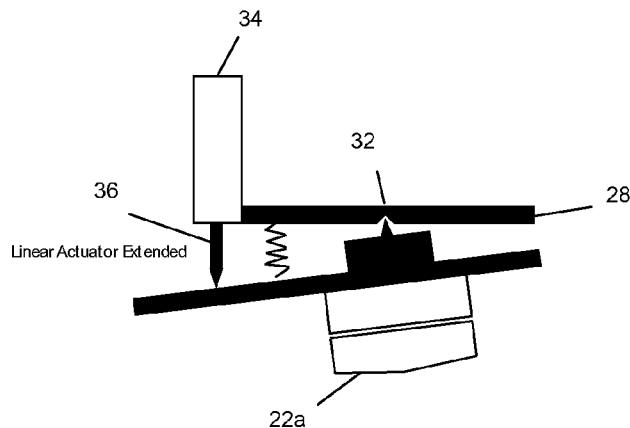
Figure 2C:
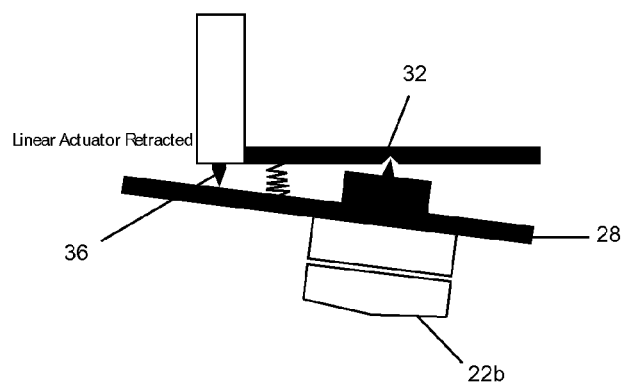

FIGS. 2(a), 2(b) and 2(c) illustrate schematically an embodiment of a tilt stage for use with the probe assembly of the present invention, the tilt stage being shown with respectively no (2(a)), first (2(b)) and second (2(c)) probes selected.

Figure 3:
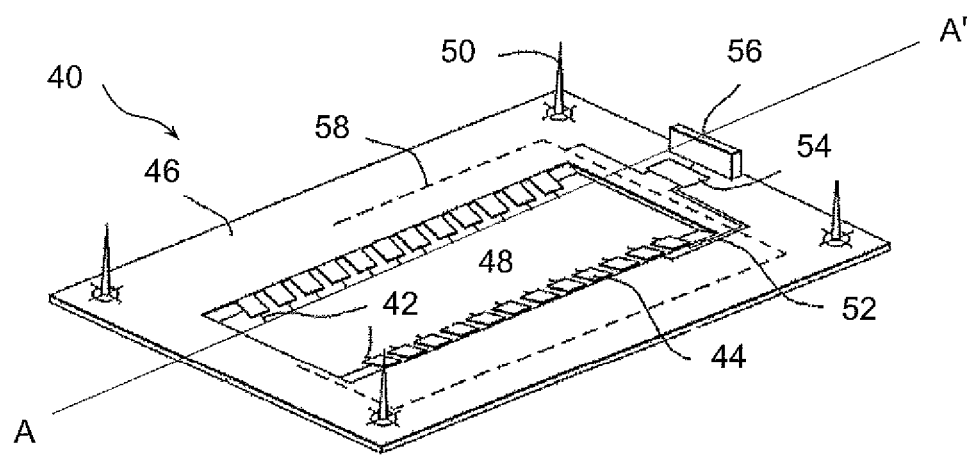

FIG. 3 illustrates a prior art probe assembly for use in scanning probe microscopy.

Figure 4:
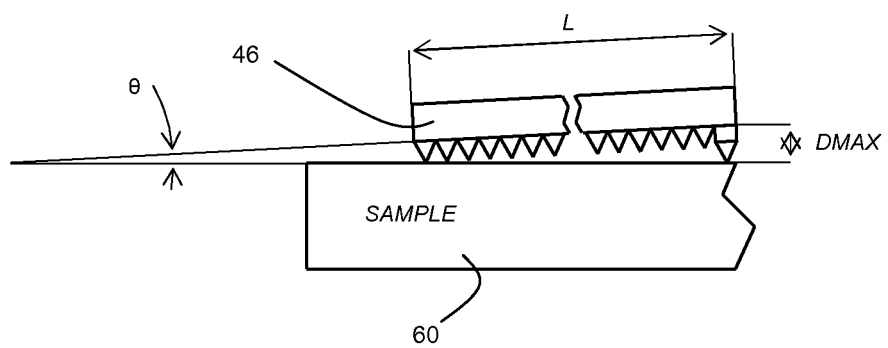

FIG. 4 is a schematic illustration of a section along AA' of a probe assembly similar to that shown in FIG. 3.

Figure 5A:
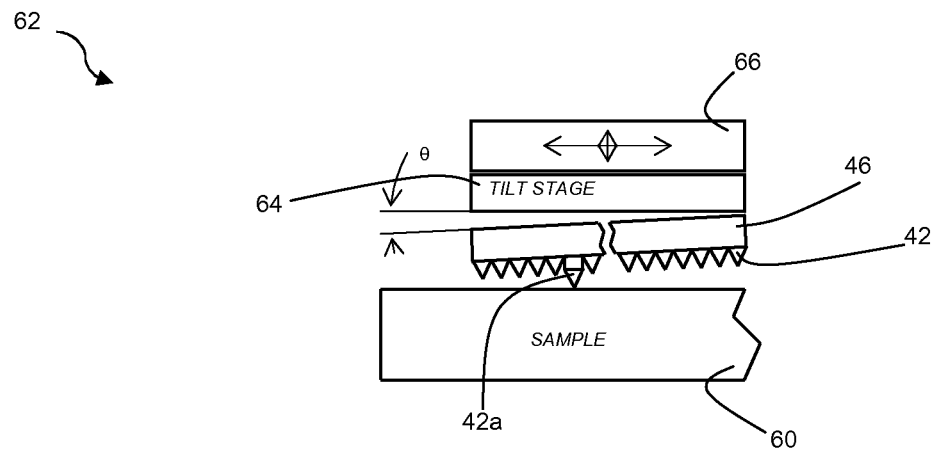

FIG. 5(a) illustrates a second embodiment of a probe assembly, exchange mechanism and scanning mechanism for use in scanning probe microscopy in accordance with a second application of aspects of the present invention.

Figure 5B:
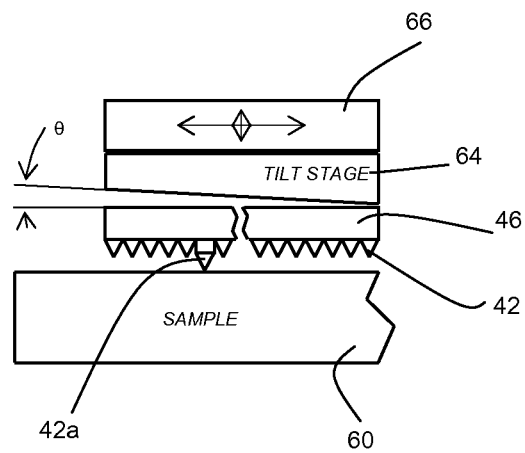

FIG. 5(b) illustrates the probe assembly of FIG. 5(a) following compensation for misalignment of the probes within the assembly.

Figure 6A:
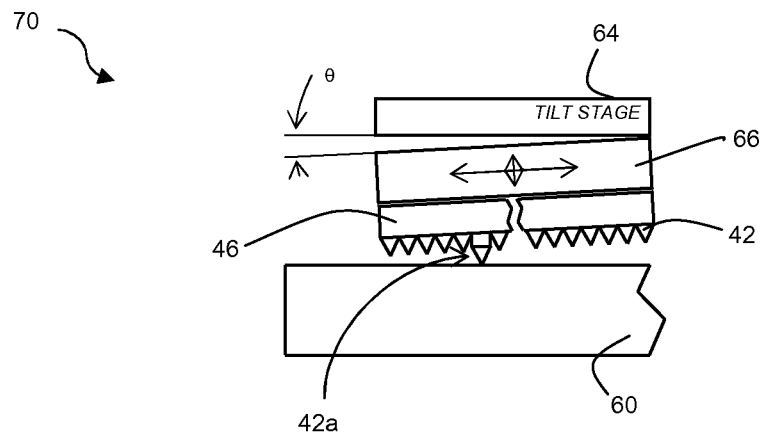
Figure 6B:
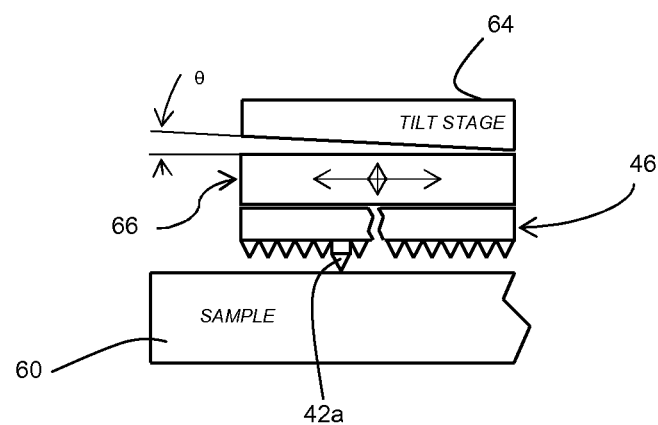

FIGS. 6(a) and 6(b) illustrate the probe assembly of FIG. 5 with an assembly, exchange mechanism and scanning mechanism arranged in accordance with an aspect of this invention.

Figure 7A:
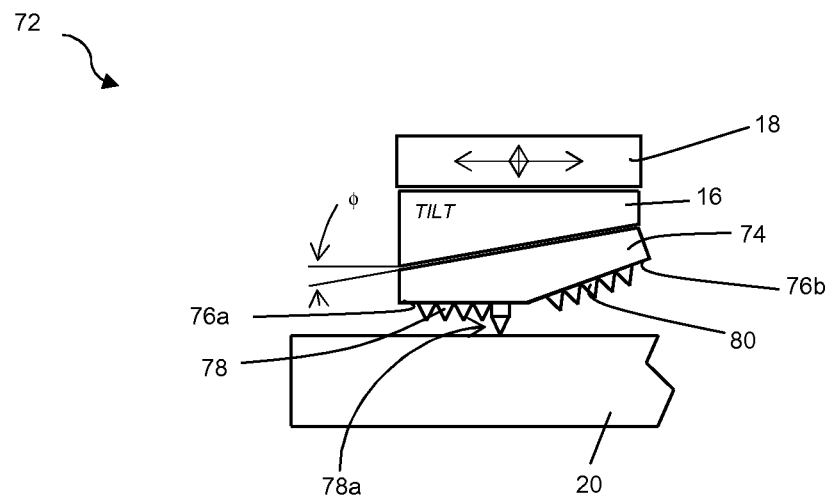
Figure 7B:
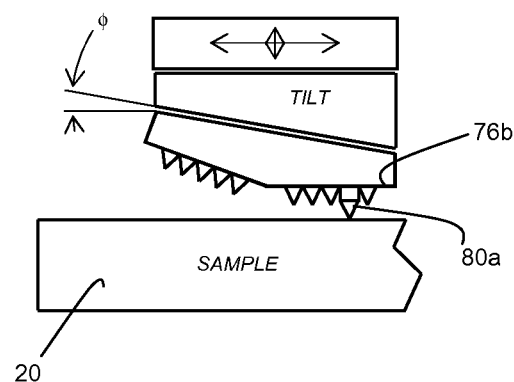

FIGS. 7(a) and 7(b) illustrate a third embodiment of probe assembly and exchange mechanism with the first scanning mechanism, in first and second selection configurations.

Figure 8A:
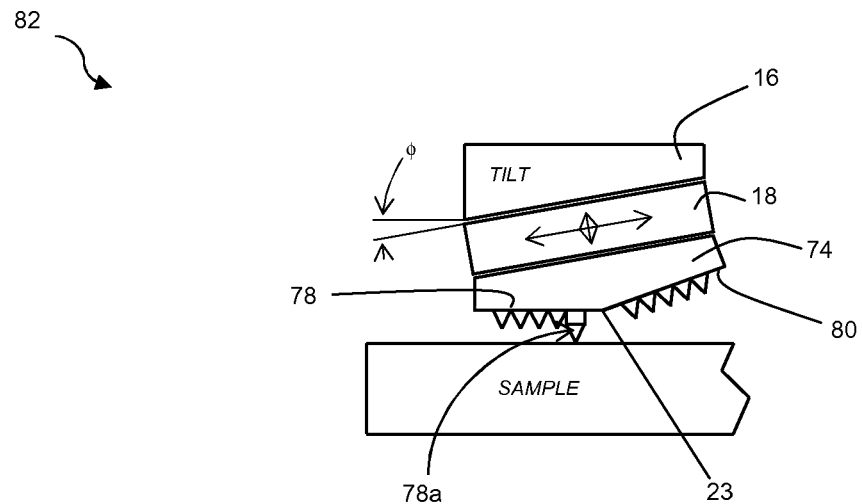
Figure 8B:
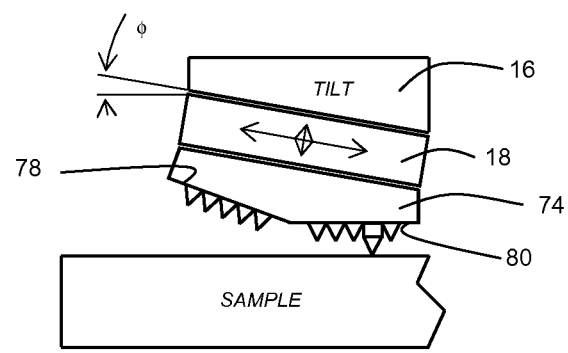

FIGS. 8(a) and 8(b) illustrate the third embodiment of probe assembly and exchange mechanism with the second scanning mechanism, in first and second selection configurations.

Figure 9A:
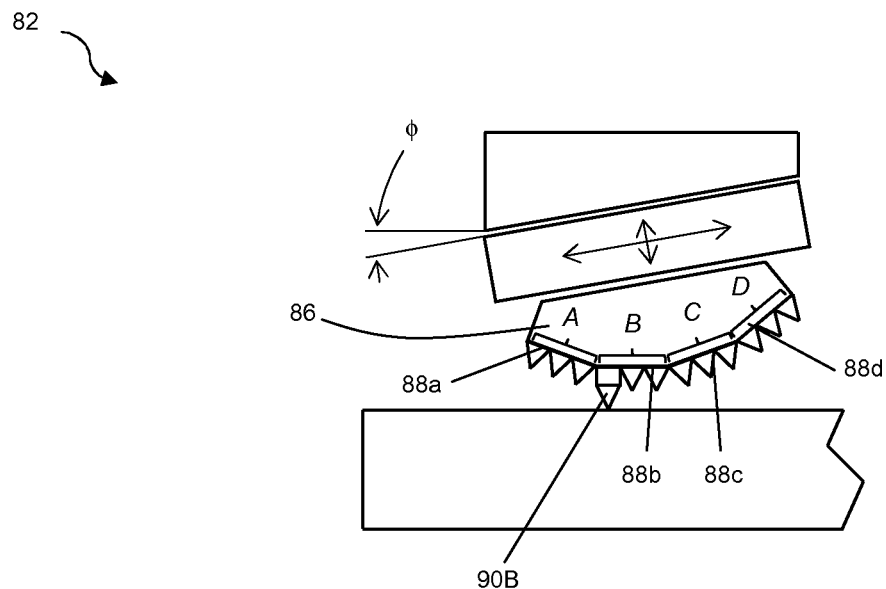
Figure 9B:
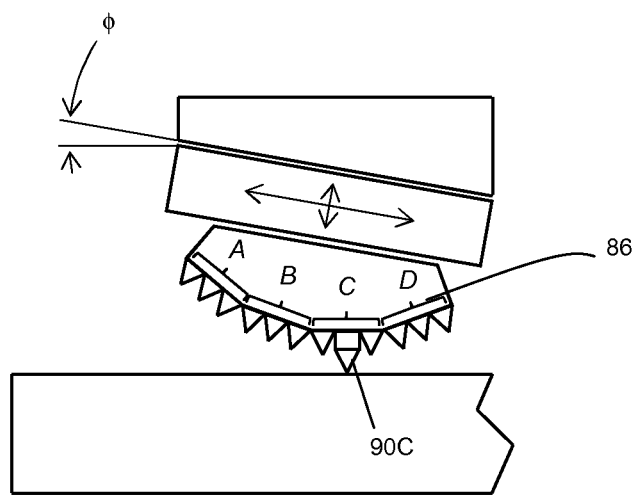

FIGS. 9(a) and 9(b) illustrate a fourth embodiment of probe assembly and exchange mechanism with the second scanning mechanism, in first and second selection configurations.

Figure 10A:
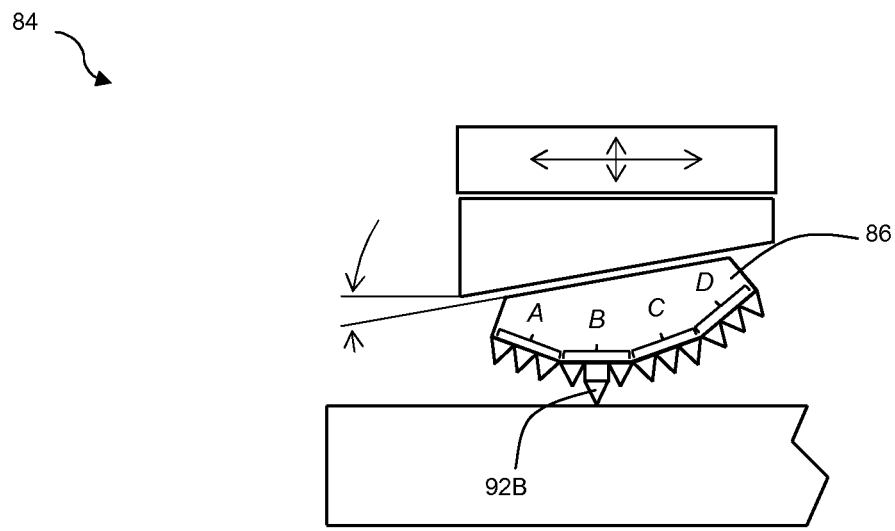
Figure 10B:
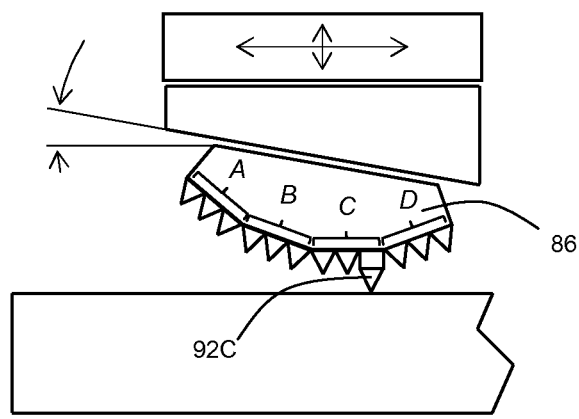

FIGS. 10(a) and 10(b) illustrate the fourth embodiment of probe assembly and exchange mechanism with the first scanning mechanism, in first and second selection configurations.

Figure 11A:
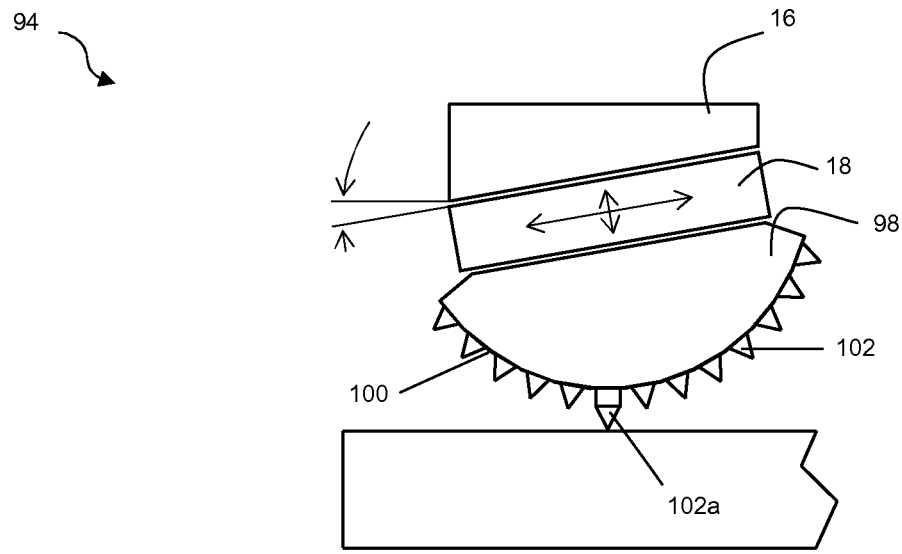
Figure 11B:
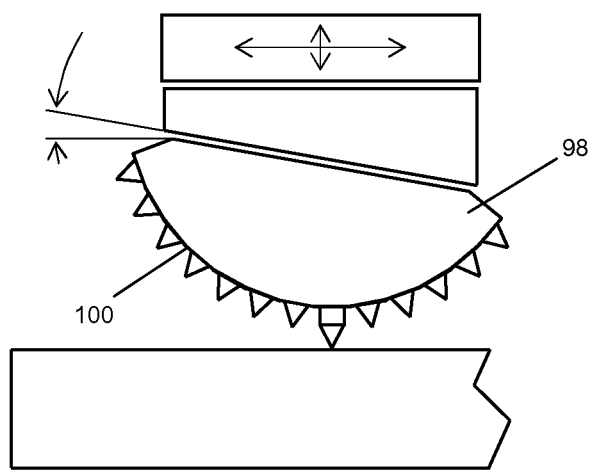

FIGS. 11(a) and 11(b) illustrate a fifth embodiment of probe assembly and exchange mechanism with the second scanning mechanism, in first and second selection configurations.

Figure 12A:
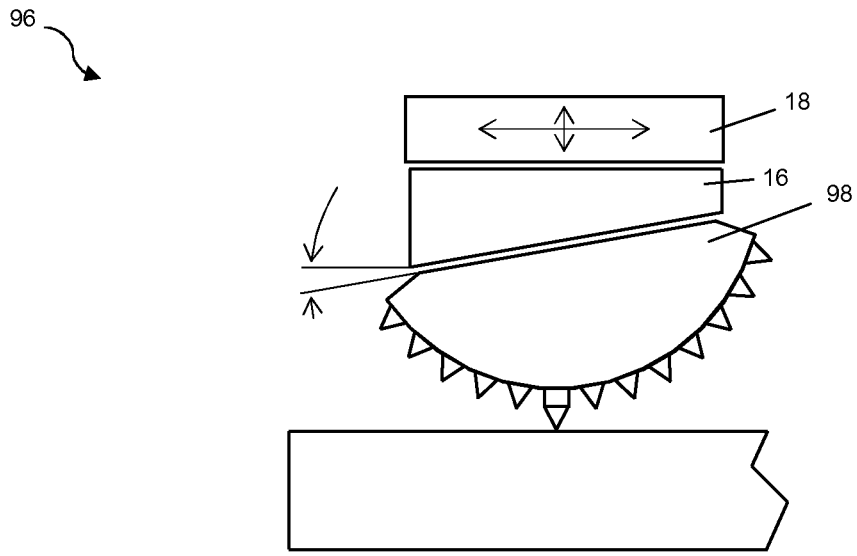
Figure 12B:
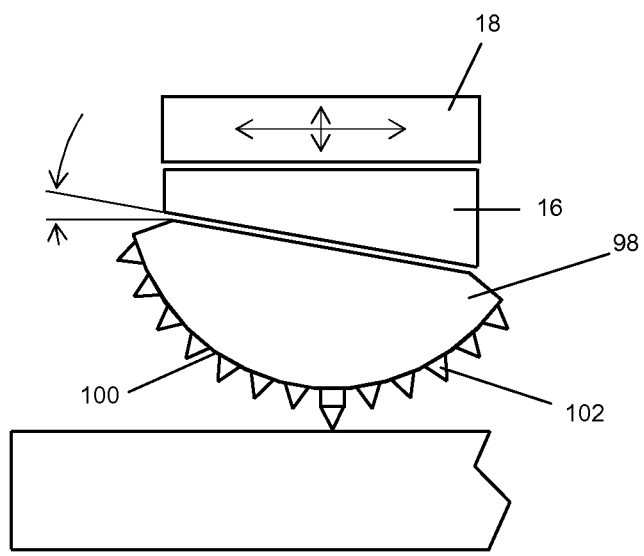

FIGS. 12(a) and 12(b) illustrate the fifth embodiment of probe assembly and exchange mechanism with the first scanning mechanism, in first and second selection configurations.

Figure 1A:
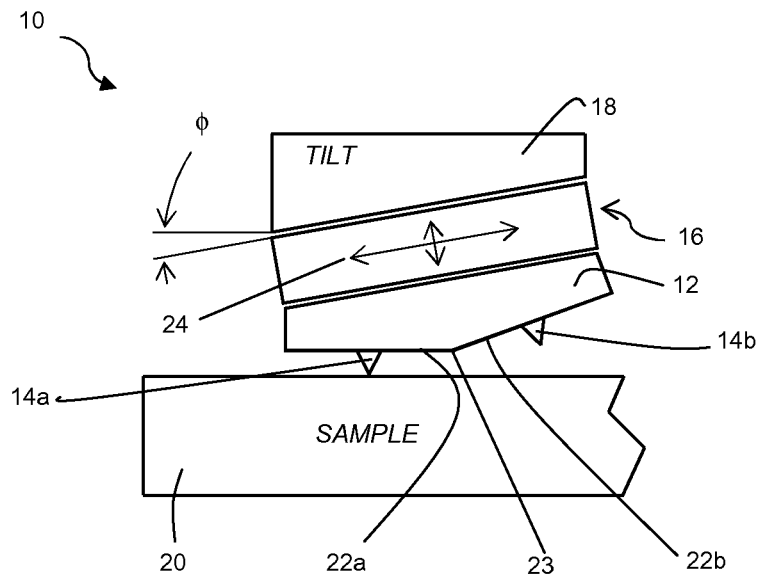
FIG. 1(a) illustrates a first embodiment of a probe assembly, exchange mechanism and scanning mechanism for use in scanning probe microscopy in accordance with a first aspect of the present invention showing selection of a first probe.
Figure 1B:
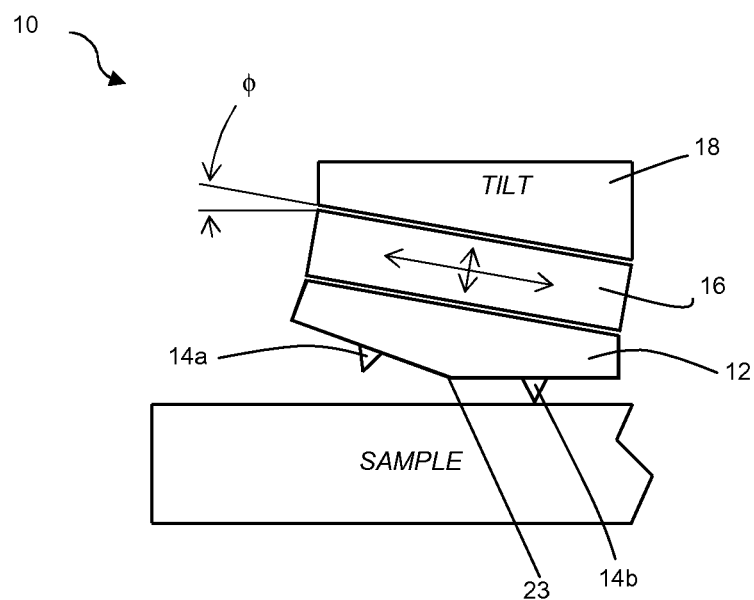
FIG. 1(b) shows the embodiment of FIG. 1(a) in a configuration with a second probe selected.
Figure 1C:
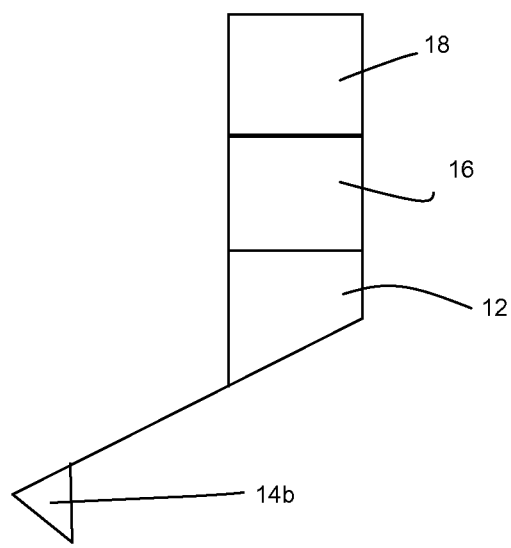
FIG. 1(c) is a side view of the probe assembly shown in FIGS. 1(a) and 1(b), with one probe omitted for clarity.

With reference to FIGS. 1(a), 1(b) and 1(c) there is shown a probe assembly 10. The assembly 10 comprises a carrier 12, which supports a pair of probes 14a, 14b, a scanner 16 mounted on the carrier 12 and a tilt stage 18 mounted on the scanner 16. The scanner 16 is operable to drive the carrier 12 in three dimensions and so facilitates a scan of a sample 20 when the probe assembly 12 is incorporated in a microscope. The carrier 12 has two 22a, 22b lower faces that meet at a shallow angle, typically of the order 3°. Each lower face 22a, 22b supports a respective probe 14a, 14b. The tilt stage 18 is operable to tilt the carrier 12 and scanner 16 about an axis 23 running longitudinally to the probes 14a, 14b but substantially in the plane of the sample. That is, the rotation is such as to position the carrier 12 in order that one or other of its lower faces 22a, 22b is oriented towards the sample.

In preparation for a scan, the carrier 12 is tilted using the tilt stage 18 to orient a selected face towards the sample 20. The face need not be parallel to the sample 20; in fact the carrier will likely be mounted at an angle that will depend on the specific cantilever application and also on the design and alignment of the detection system of the microscope in which it is used. This can be seen in the side-view of the assembly shown in FIG. 1(c). It should be noted that one probe is not illustrated and the angles shown in these Figures are exaggerated for clarity. The degree of tilt 18 required to orient the carrier 12 should be accurately known and so is determined empirically, as will be discussed in more detail below. In FIG. 1(*a*), the left-hand face 22*a* is shown in this position. The microscope detection system is aligned with the probe 14*a* that is mounted on this face and the selected probe 14*a* is then brought into proximity with the sample 20. The scanner 16 is then operated to drive the probe 14*a* across the plane of the sample (x, y scan, in conventional terminology) and data is collected with which to construct the map or image of the sample.

In describing this invention reference will be made to a conventional orientation of Cartesian axes. The z direction is perpendicular to the plane of the sample 20 and therefore corresponds to the direction of vertical adjustment in order to maintain feedback. The probe is scanned in the x, y plane, the y direction being that corresponding to the projection of the probe cantilever arm on the plane of the sample.

Once the scan with the first probe 14*a* is complete, the tilt stage 18 is driven to bring the second face 22*b* and second probe 14*b* into alignment with the sample surface and a second scan, which may be complementary to the first, can be carried out with this probe 14*b*. This latter configuration is shown in FIG. 1(*b*). In this way an exchange of probes in accordance with this invention is facilitated.

The angle between the carrier lower faces 22*a*, 22*b* is such that the process of orienting one face 22*a* substantially parallel with the sample surface naturally raises the probe 14*b* mounted on the other face 22*b* away from the surface. In this way, the unused probe cannot interfere with the scan made by the selected probe.

Ideally the two lower planes 22*a*, 22*b* of the carrier 12 that support the probes meet along an axis 23 that runs substantially parallel with the mounting angle of the probes. The tilt stage 18 is driven to rotate the carrier about this axis. This tilt axis, when projected onto the sample surface, runs substantially parallel to the y-axis. Alternatively, the tilt axis may run parallel to the y-axis, or indeed adopt a convenient orientation inbetween, depending on the construction of tilt stage and carrier. The tilt axis need not, in fact, coincide with the intersection of the two lower planes of the carrier. All that is required is that operation of the tilt stage adjust the angle at which a line connecting and extending beyond the two probe tips intersects the plane of the sample surface.

It can be seen that this invention differs from the prior art by incorporation of the tilt stage 18 in the probe assembly in order to facilitate probe exchange. The tilt stage enables only a minimal adjustment to be used to bring a selected probe into and out of a scanning position. This is a far smaller range of movement than required in the prior art systems described in U.S. Pat. No. 5,157,256, U.S. Pat. No. 5,705,814 and U.S. Pat. No. 7,597,717. This present invention therefore permits probe exchange that is quicker and less susceptible to mechanical errors that affect the ability of the microscope to carry out an accurate scan.

As mentioned previously, in order to make use of this probe exchange mechanism, the angle required to drive the tilt stage through to exchange the probes should be predetermined. This angle is derived from the alignment of the carrier 12 to the sample surface. The process of determining empirically this alignment is referred to herein as "registering" the carrier. The angle between the faces on the carrier surface will be known from its manufacture, or may be measured under an optical microscope. The alignment of the carrier to the tilt mechanism may however vary due to mounting and manufacturing tolerances. Complete carrier registration is therefore carried out in situ.

The alignment of the carrier to the sample surface can be determined in one of two ways: measurement of the relative heights of two or more probes relative to a plane parallel with that of the sample (e.g. the sample mount); or measurement of the angle of the assembly (carrier plus tilt stage) relative to the same plane.

Relative probe heights may be determined in a variety of ways. One method is to view through an optical microscope the one or more probes along a line that enables their differing heights to be observed. The vertical positions of the probes will be apparent in the image, from which their relative heights can be extracted. A second possibility is to make use of an optical microscope (or other optical viewing system) that is commonly aligned with the probe detection system of a SPM. A beam of light is brought to a focus on the back of each probe in turn. The exact location of the focus can be found by several well-known methods, for example, by analysing the optical image data, or by using an additional light source illuminating the probe through the objective and monitoring a path followed by light reflected therefrom. The relative vertical positions of the focus points, and hence of each probe, are accordingly extracted. A third alternative is to use the probe detection system itself to provide an indication of the relative heights of the probes. Each probe is moved towards a surface and the position of the interaction of the probe tip and surface established. Comparison of these positions yields an indication of relative probe height.

Any of the above methods may be used to determine the relative height of the probes. The tilt stage may then be adjusted to equalise the heights, and the tilt angle required to bring one probe into close proximity with the surface is simply half the known or measured angle between the carrier surfaces. Alternatively, the disparity in heights is maintained and, using the known geometry of the carrier, incorporated in determining the tilt angles required to bring each respective probe into alignment.

As an alternative to measuring probe height, the angle between the carrier and the sample plane may be measured directly to derive tilt angle. This angle can be measured by aligning each probe with the microscope detection system and measuring the angle at which light is reflected from the back of the probe. Once determined, the relative tilt of the probes may be adjusted such that their magnitudes are equal (but directions opposite), or the disparity maintained and incorporated in determining the tilt angles required to bring each respective probe into alignment.

The embodiment of the invention shown in FIG. 1 is particularly suited to the exchange of different types of probes. The individual probes may be tailored towards implementing one or more of the following SPM techniques: atomic force microscopy, either contact mode in which probes typically have a low spring constant e.g. <2 N/m or dynamic mode in which probes typically have a higher spring constant e.g. >10 N/m and typically 40 N/m and sometimes higher; scanning capacitance microscopy; scanning ion-inductance microscopy; scanning spreading resistance microscopy, spreading resistance profiling; second ion mass spectrometry; scanning tunneling microscopy; scanning thermal microscopy; scanning voltage microscopy; magnetic force microscopy; electrostatic force microscopy; Kelvin probe force microscopy and dip pen nanolithography, for which probes have a hardened coating such as diamond. In addition, probes may be designed with different geometries for imaging specific types of structure: probes with re-entrant shaped tips specifically for use in 3D imaging of undercut structure; probes having different aspect ratios, higher aspect ratios being better adapted for imaging inside structures such as holes and trenches; probes having differing sharpness, sharper tips providing improved resolution. In this way, an assembly in accordance with this invention may be used to switch between probes used for measuring different interactions and surface properties, such as electric fields, magnetic fields or electronic properties. A further possibility is to switch between a probe used for imaging a sample surface and a probe used in nanolithography of that same surface, without replacement of the probe assembly.

With a single probe carrier having a plurality of different types of probe, it is possible for example to perform an initial high speed review of a sample area for identification of a location of interest, and then a slower, more delicate, or otherwise complementary scan of the identified location, without changing the probe carrier. This capability is particularly advantageous because with conventional scanning microscopy apparatus it can be very difficult to return accurately to a sample location with a different probe, after the initial scan in which the area of interest has been identified. In order to ensure this reproducibility between probes located on different carrier surfaces, it is desirable to carry out a registration scan of a test sample. A suitable sample has a structure that permits the identification of a unique location on its surface in each test image. For example, the well-known series of interlocking triangles known as a "bow tie" pattern. Mapping of the two unique locations in respective images enables the relative probe locations to be inferred, or else adjusted by way of compensation. Conventional scanning microscopy methods would be, in comparison with employing the probe assembly of the present invention, very time consuming.

A particular application in which using multiple probe configurations to provide scans of different characteristics is beneficial is in the semiconductor industry. In the assessment of a semiconductor wafer where, once an area of interest has been located using a standard probe tip, a sharper probe tip may be selected from the same probe assembly, to perform a slower scan of the location of interest to provide a more detailed image of this selected area. Alternatively the area of interest can be rescanned with a probe tip with high aspect ratio and/or a re-entrant shape. The sharper probe provides a higher resolution measurement of the roughness of the surface and the high aspect ratio probe tip can enter holes and trenches in the surface of the wafer.

In the embodiment of the invention shown in FIG. 1, the scanner 16 is below the tilt stage 18 and supports only the carrier 12. The alternative configuration is possible in which the scanner 16 drives both the carrier 12 and tilt stage 18. The FIG. 1 configuration is however advantageous, and so included in one aspect of this invention, in that the scanner 16 drives a lower mass: that of the carrier 12 only. Accurate scanners that drive the probes along a well-defined trajectory are important to ensure quality of image. In achieving this, it is preferable to minimise the mass of the components being driven by the scanning system. As noted previously, a particular advantage of minimising the mass is to increase the mechanical resonant frequency of the system. This enables higher operating (scanning) speeds and reduces coupling of the system to mechanical environmental noise.

There is a complication inherent however in adopting the lower-mass arrangement of FIG. 1. It can be seen that once a probe has been selected, two drive directions of the scanner 16, those indicated by arrows 24 in the Figure, are no longer aligned parallel and perpendicular to the sample surface. In performing a scan using a typical scanning probe microscope, the drivers are set to move the probe across the surface in a raster pattern. The x, y position of the probe is generally deduced from the position of the scanner. If the orientation of the scanner is tilted then the x position of the probe will need to be recalibrated for this tilt alignment: $X = x \cos \phi$, where $\phi$ is the angle away from the horizontal through which the tilt stage 18 is moved, x is the original scan size and X its corrected value. That is, each time the tilt stage 18 is adjusted a recalibration procedure will need to be carried out. In addition, movement in the scanner z direction is typically used to extract information relating to the height of the sample. The scanner z movement will therefore no longer correspond to a direction perpendicular to the sample surface, which in turn means it loses its correspondence with sample height. A correction will be required to allow for the angular adjustment:

It should be noted that although, for clarity, the example of the tilt axis presented above is taken as the y axis of the scanning system, this alignment is not necessary. The tilt axis could be any direction such that a selected probe may be brought into alignment with the sample surface. Clearly though, in the more general case, all three components (x, y and z) used to define positions of the probe will have to be recalibrated as a result of the tilt.

In describing operation of a SPM reference has been made above to a probe being brought into "close proximity" with a sample. This refers to a region in the vicinity of the sample at which the interaction to be monitored by the particular mode of SPM operation is established. The term may therefore refer to a different separation distance, depending on the particular mode of SPM operation. Similarly a "scan" has been referred to a conventional lateral movement across an xy plane. It may however follow a different pattern and use of the term is intended only to refer to a series of measurements being taken of the interaction between probe and sample. That is, neither term is to be considered restrictive.

The tilt stage 18 may be constructed in a number of known ways and an example of one is shown in FIG. 2. In FIG. 2(a) the tilt stage 18 is shown in its untilted configuration mounted on the scanner 16 and carrier 12, as for FIG. 1. Neither lower surface 22a, 22b is therefore oriented for a scan. The tilt stage 18 comprises a tilt surface 26, which is formed from a lower surface of a cantilever platform 28. The cantilever 28 is moveable with respect to an upper support 30 about a pivot point 32. A linear actuator 34 with driving arm 36 and spring 38 connect the cantilever 28 with the upper support 30. The spring 38 generally provides an upwards force, which will hold the cantilever platform 28 in contact with the drive of the actuator arm 36 as it is lowered and raised.

FIG. 2(a) shows the tilt stage 18 in its level orientation. The actuator arm 36 is extended such that the cantilever platform 28 is aligned substantially parallel with the sample surface (not shown): the intersection between carrier lower surfaces 22a, 22b points downwards. In this position, the spring 38 is in extension and so provides an upwards force, maintaining contact between the cantilever 28 and the actuator drive 36.

As the actuator arm 36 is extended, it acts to push the left-hand side (in FIG. 2) of the cantilever 28 towards the sample surface (downwards). The cantilever 28 thereby pivots about the pivot point 32, tilting the stage. At the actuator position shown in FIG. 2(b), the stage has tilted the carrier 12 to the extent that the probe on surface 22a is selected.

As the actuator arm 36 retracts, the spring 38 acts to maintain contact with the cantilever 28, and the stage is tilted about the pivot point 32 in an opposite direction. At the position shown in FIG. 2(c), the carrier 12 is now oriented such that the probe on surface 22b is selected.

A preferred embodiment of tilt mechanism is a kinematic mount. This system is based on an arrangement of three points of contact between tilt surface 26 and upper support 30: a point contact, groove and flat contact. This arrangement can be adjusted with a high degree of accuracy. The point, groove and flat may be mounted either on the tilt surface 26 or upper support 30.

The probe assembly of the present invention may be adapted for applications other than probe exchange or replacement. It is also suited to providing an opportunity for accurate alignment of a probe array. A prior art probe assembly 40, as disclosed in WO 2008/053217, is shown in FIG. 3. The probe assembly 40, has a plurality of individual probes 42 mounted on respective substrates 44. The substrates 44 are, in turn, mounted on a carrier 46, which is common to all of the probes. The probes 42 are accommodated, ideally in pre-determined spatial positions, along internal edges of a slot 48 within the carrier 46.

The carrier 46 includes means 50 for securing the carrier to the probe mount (not shown) of the microscopy apparatus, for example mounting pins 50 or other conventional means. When secured, the probes 42 are generally oriented towards a sample (not shown).

The carrier 46 further includes addressing means 52, which enables one of more probes to be selected in preference to the remainder. A number of possible implementations of this addressing means are possible: in the embodiment shown in the Figure electrical connections 52 link each probe 42 via a multiplexer 54 to an external power supply 56. An upper electrode 58 (indicated in dotted lines) may be provided over the probe assembly 40, on the opposite side of the assembly to the sample. With this arrangement, application of an electrical potential between the probes and the coating of the upper electrode 58, will result in the probes being attracted towards the upper electrode 58 and so away from the sample. The multiplexer 54 is adapted to select one (or more) particular connection 52 and to connect the remainder with the external power supply 56. An electrical potential is therefore applied to all of the probes except the selected probe or probes, moving these probes upwards, away from the sample, and leaving the selected probe(s) closer to the sample in preparation for scanning. Whilst each probe 42 is provided with a respective electrical connection 52, the tip of the probe is isolated from the connection 52 to ensure that the tip-sample interaction is not affected. A preferred embodiment of addressing means however is based on thermally-induced bending of the cantilever. A silicon nitride cantilever is provided with a gold, or other materials with a differing thermal expansion, coating. A light source, typically a laser is directed onto the cantilever of the selected probe, resulting in a localised heating. The differential thermal expansion of the two cantilever materials results in a bending of the cantilever, and therefore selection of that probe.

Regardless of the details of the addressing means, it is arranged such that selection is performed by lowering the chosen probe or probes, or by raising all unselected probes. When no probes are selected the probe tip of each of the probes is located in a common plane. When one or more of the probes is selected, the probe tips of either the selected probes or all unselected probes are caused to move out of the common plane relative to the remainder of the probes. The probe-sample distance is then adjusted so as to bring the selected probe or probes into close proximity or contact with the surface of the sample.

FIG. 4 is a schematic illustration of a section along line AA' of a probe assembly 40 similar to that shown in FIG. 3. For the sake of clarity, only a small number of probes 42 are illustrated in FIG. 4. In practice, it is envisaged that each multi-probe assembly 40 may have many more probes. For example, the individual probes may be separated from each other from as little as a few microns up to tens of microns, or more. This would enable hundreds of probes to be provided on a single edge of a 5 cm probe assembly. In FIG. 4, the carrier 46 is illustrated with a break, to indicate a missing middle section of the probe assembly 40, this section being omitted for the sake of clarity.

In FIG. 4, the carrier 46 has a length L along which a number of probes 42 are spaced. One of the probes 42a is selected by the addressing means (not shown in this figure) and accordingly is lowered below the plane of the remainder of the probes 42 to move into close proximity with a sample 60. Due to fabrication tolerances, alignment tolerances or other source of inaccuracy, the carrier 46 shown in FIG. 4 is not ideally aligned with the sample surface but is tilted through an angle θ.

The displacement of the selected probe 42a from the plane of the remainder is caused by the selection means. If this displacement is denoted by d then it follows that, for all probes, d must be sufficient for the selected probe 42a to be brought into close proximity with the sample whilst the remainder of the probes are held clear. If this were not the case, then image collection would be compromised as, on occasion, the selected probe may be unable to reach the proximity of the sample or, on other occasions, multiple probes may be in the proximity of the sample. In the latter case, there is a possibility that the unselected probes may damage the sample or vice versa and/or they may affect the measurement being performed by the selected probe. In the extreme situation shown in FIG. 4, the probe that is oriented lowermost as a result of carrier tilt (at the left hand side of the Figure) is just in contact with the sample at tilt angle θ. At this limiting position, the displacement of probe i must be greater than $L_i \sin \theta$, where $L_i$ denotes the position along the carrier 46 of the selected probe. Or, put another way, the maximum displacement of the furthermost probe (the selected probe 42a in FIG. 4) from the contact point $d_{max}$ sets a limit on the tolerance by which carrier orientation may be permitted to deviate from the horizontal:

$$\sin\theta < \frac{d_{max_{15}}}{L}$$

It is desirable to be able to make practical use of probe assemblies for which the length L of the carrier that supports the probes 12 is 20 mm. For a typical selection mechanism, the maximum displacement $d_{max}$ that may be imparted is 20 μm. This value takes account of the angular position of the probe along the y axis (pitch). For example, a 100 μm cantilever mounted at an angle of 12.5° to the sample surface has a vertical height of 21.5 μm at its base. This limit to the displacement sets a tolerance limit on the tilt angle θ of 0.06°. It will of course be appreciated that such alignment of the carrier 46 parallel to the sample surface is practically very difficult to achieve. Even for smaller probe arrays of 5 mm length, the alignment tolerance is just 0.3°. It should be noted as well that these tolerance values make no allowance for any variation in sample surface topography, which may exacerbate the situation.

A second embodiment of a probe assembly 62 in accordance with this invention is shown in FIG. 5. As in the prior art, the probe assembly 62 includes an array of probes 42 supported on a carrier 46. Addressing means (not shown) may select one or more probes 42a by movement out of the common plane occupied by the remainder of the probes. In accordance with this embodiment of the invention, the probe assembly 62 includes a tilt stage 64 mounted on the carrier 46 and a scanner 66 that drives the tilt stage 64 as it supports the carrier 46. The tilt stage is operable to tilt the carrier 46 in a direction along the line of the probe tips (x direction). The scanner 66 is operable to drive the carrier 46 plus tilt stage 64 in three dimensions and so facilitates a scan when the probe assembly 62 is incorporated in a microscope.

As with the previous embodiment, the tilt stage 64 may be constructed in a number of known ways. Preferably, it is based on the cantilevered hinged mechanism shown in FIG. 2. What is important is that the stage 64 is able to tilt the line of the probe tips though an angle and so to set the carrier 46 in a more parallel alignment, in this direction, with the sample surface. FIG. 5a shows the arrangement of carrier 46, tilt stage 64 and scanner 66 prior to adjustment. As can be seen, the carrier 46 rests at an angle θ to the horizontal. A tilt-adjusted arrangement is shown in FIG. 5b. The tilt stage 64 has been driven to tilt the carrier 46 through a compensatory angle θ, in the opposite direction, in order to provide a near-parallel alignment of probe tips. Once in this compensated position, the scanner 66 is operated as in the prior art to move the selected probe 42a in an x, y scan across the surface of a sample. Feedback control is provided by adjustment in the z direction.

For accurate measurements, it is important to determine accurately the degree of tilt adjustment θ required to align the array. This may be done in a number of ways. For example, in preparation for a scan, the selected probe 42a is first moved out of the common plane. The microscope detection system is then aligned with the selected probe 42a. The back of the probe 42a is illuminated by the beam of the detection system and reflected back to the collection optics. The probe 42a position is adjusted in x and y and also by adjusting the angle of the carrier 46 using the tilt stage 64. Once the back of the probe 42a is at the correct angle, the reflected beam will be directed back to the detection system and the tilt stage 64 will have positioned the line of probes 42 substantially parallel to the sample 60. The selected probe 42a is then brought into proximity with the sample 30 and the scanner 66 is operated to drive the probe 42a across the plane of the sample (x, y scan, in conventional terminology). Data is collected with which to construct the image.

The above method of registration makes the assumption that once the back of the probe is aligned with the detection system, then the array is also correctly aligned. Alternative methods do not rely on this assumption. An optical technique, using the method described before in relation to FIG. 1 may be used. That is, relative heights of two probes, ideally well-separated in the array, are determined. The tilt stage is then adjusted to equalise the heights, at which point the array will be aligned. Similarly, the relative deflection of two separated probes may be minimised in order to ensure probe alignment.

A third embodiment of a probe assembly 70 in accordance with this invention is shown in FIG. 6. FIG. 6a shows the assembly in its uncompensated (carrier tilted) position and FIG. 6b shows it in its tilt-compensated position. This embodiment differs from that shown in FIG. 5 by the arrangement of tilt stage 64 and scanner 66. The scanner 66 is arranged to drive only the carrier 46 in the x, y and z directions. The tilt stage 64 supports both the scanner 66 and carrier 46 and accordingly is arranged to tilt both in compensating for angular misalignment θ.

It has been noted above in relation to probe exchange that the two configurations of tilt stage 64 and scanner 66, illustrated for example in FIGS. 5 and 6, have their advantages and disadvantages. These apply equally to the application of the invention to probe array alignment. In the FIG. 5 embodiment, the tilt stage 64 adjusts only the carrier 46, leaving the scanner 66 with its drive directions aligned with the sample surface. The scanner 66 is however required to drive the larger mass of carrier 46 plus tilt stage 64 when performing a scan. In the FIG. 6 embodiment the scanner 66 drives only the carrier 46 during the scan, which is advantageous particularly in fast-scanning applications, but the disadvantage is that its scan directions are no longer aligned in a straightforward manner with the orientation of the sample surface. The FIG. 6 arrangement of scanner and tilt stage is however preferred and so is essential to one of the aspects of this invention.

In both the embodiments described in FIGS. 5 and 6, the tilt stage 64 is operable to tilt the carrier 46 about an axis (y axis) running perpendicular to the line of the probe tips in the array 42. For such probe arrays, adjustment on a perpendicular axis along the line of the probes (x axis), which would serve to change the angle of the cantilever at which the probe 42 contacts the sample 60, is neither required nor desirable. This angle is less critical to probe alignment and to the quality of image obtained.

As noted above, there is a range of potential applications for scanning a sample with different probe types: for example different aspect ratios, varying probe sharpness, contact and non-contact modes, etc. It is clearly therefore desirable to manufacture a carrier that includes multiple probe types. A problem arises however when fabricating different probe types in an array 42 as shown on the prior art probe carrier of FIGS. 3 to 6. Different probe types are generally made by different fabrications methods. At the scales involved in probe manufacture, this frequently results in probes having different dimensions, e.g. differing thicknesses of chip on which each probe is mounted, differing lengths of beam, differing lengths of tip, etc. With single probes, this is not normally a problem. With multiple probes, it complicates not only the alignment of tips of along a common plane, as required for accurate probe selection on the prior art carrier, but also the degree of probe bending required to select a probe. For example, a high spring-constant probe requires a greater force or induced stress to bend the cantilever beam than a low spring-constant probe. This can make it difficult to integrate the selection actuator.

For these reasons it is preferred that different probe types are located on different carrier surfaces, as shown in FIG. 1. This FIG. 1 embodiment does not require a separate actuator for probe selection; this is effected using the tilt stage 16. This is particularly beneficial to situations in which it may be difficult to integrate a selection actuator. The process of adding an actuator may increase the cost of probe fabrication and, more problematically, may not be compatible with certain probe fabrication methods. Moreover, the inclusion of an actuator will inevitably affect the properties of a known cantilever design.

From the above, if an array of probes is to be located on a single carrier surface, then they are preferably identical. A further embodiment of this invention that incorporates features of the two previous embodiments is illustrated in FIG. 7. In this embodiment 72, the tilt stage 16 and scanner 18 of FIG. 1 support an alternative design of carrier 74. The tilt stage 16 and scanner 18 are shown in their alternative, less-flexible configuration, that is, the tilt stage 16 supports the scanner 18 and is therefore also driven by the scanner 18 during a scan. The preferred arrangement is of course possible, as shown in FIG. 8. This probe assembly 72 differs from that previously described in that the two lower faces 76a, 76b of the carrier 74 each support a respective bank 78, 80 of probes. The probes in each bank 78, 80 are preferably identical for the reasons given above, although the probes may differ between banks. FIG. 7a illustrates selection of a probe 78a in the left-hand bank 78.

First the tilt stage 16 is driven such that the first lower face 76a is oriented towards the sample surface. Accurate alignment of the array of probes in this bank 78 is ensured by prior registration of the carrier. That is, the position to which to drive the tilt stage 16 to ensure substantially parallel alignment of the probes in this bank 78 and the position to which to drive it to ensure alignment of probes in the other bank 80 is determined prior to a scan. Next, separate addressing means selects one probe 78a by moving it out of the plane occupied by the remainder of the probes in the bank and towards the sample 20. Thereafter a scan using this probe 78a may be carried out.

After completion of this scan, the microscope operator may then choose to select a second probe from this bank 78 by use of the addressing means. The predetermined alignment position of the surface 76a with the sample serves to retain the remainder of the probes in the bank away from the sample surface. The probes in the other bank 80 are, of course, held away from the sample by virtue of the upwards tilt of their respective lower surface 76b. Alternatively, the operator may choose to select a probe 80a from the second bank 80 (see FIG. 7b). The tilt stage 16 will, in this case, be driven to align the lower face 76b that supports this second bank 80 to an orientation in which the line of probe tips is substantially parallel with the sample surface. A probe 80a is then lowered from this bank 80 towards the sample by use of a separate addressing means.

The tilt stage 16 in this embodiment, serves a dual purpose. First to select the bank 78, 80 and then to fine-tune the alignment of the carrier 74 such that the probes within the selected bank are approximately parallel, to a tolerance of less than 20 µm for a typical array size, to the sample surface. Separate addressing means of the type described in relation to the prior art is then used to select a particular probe in the bank. An advantage of using tilted surfaces to support an array of probes is that it enables the length of each array to be reduced. That is, the total probe array consists of multiple short arrays, rather than one long array. This relaxes the angular mounting tolerance of the multiple probes, making fabrication easier.

FIGS. 8a and 8b illustrate an assembly that incorporates the banks 78, 80 of probes shown in FIG. 7. In this embodiment 82, the tilt stage 16 is located above the scanner 18. The scanner 18 therefore drives only the carrier 74 in performing a scan, but correction must be made in both data collection and driving pattern for the scanner 74 in order to allow for the misalignment of scanner axes with those of the sample surface.

FIGS. 9 and 10 show alternative probe assemblies 82, 84 in accordance with the present invention. These embodiments incorporate a novel design of probe carrier 86. The Figures differ from each other in their adoption of the alternative scanner 18 and tilt stage 16 configurations. That is, in FIG. 9, the scanner 18 drives only the carrier 86 during the course of a scan whereas the embodiment shown in FIG. 10 drives both the tilt stage 16 and the carrier 86.

The probe carrier 86 in these embodiments of the invention includes four lower faces 88a, 88b, 88c, 88d, each of which may be oriented towards the plane of the sample surface by means of the tilt stage 16. Each face 88a, 88b, 88c, 88d supports a respective bank A, B, C, D of probes. The faces 88a, 88b, 88c, 88d intersect neighbouring faces 88a, 88b, 88c, 88d along axes that are oriented such that their projection on to the sample surface is substantially parallel to the y direction and perpendicular to the lines of the probes A, B, C, D. In preparing for a scan, a probe 90B is selected first by driving the tilt stage 16 such that the lower face 88b that supports the bank B in which this probe is included is aligned towards the sample surface. Separate addressing means (not shown) of the type described above in relation to previous embodiments and to the prior art, is then operated to move the selected probe 90B out of the plane of the remainder of the probes in its bank B and towards the sample. The probe 90B is then lowered into proximity with the sample and a scan is performed.

Once the first scan is complete a second scan can be performed either with another probe from the same bank B, in which case the addressing means alone makes the selection, or from a probe 90C from an entirely different bank C, in which case the tilt means 16 in combination with the Bank C addressing means performs the selection.

As for previous embodiments, each bank preferably contains identical probes, which eases fabrication requirements, whereas probes in different banks may be the same or different, depending on the application. FIGS. 10a and 10b illustrate selection of alternative probes 92B, 92C in the array.

In these FIGS. 9 and 10 only three probes are shown in each bank A, B, C, D and the angle between the lower faces is shown greatly exaggerated for clarity. In practice many more probes may be included in each bank, the likely limit being set by the width of the array and alignment tolerance. Alternatively just a single probe may be located in each bank. The angle between faces is usually of the order 3°.

Each bank A, B, C, D may be associated with its own addressing means arranged to move each probe from the common plane of the respective bank. Although more complex, this arrangement allows, for example, for the use of different addressing mechanisms with different probe types, which may require different selection mechanisms. Alternatively, a single addressing means may be used across all banks. In a third alternative a single addressing means may be used to select one probe from each bank. Probes selected on banks not oriented towards the surface will simply move out of their common plane into free space as a result of the tilt of that surface away from the sample. They will not therefore interfere with data collection.

FIGS. 11 and 12 illustrate still further alternative embodiments 94, 96 of the present invention. In these embodiments, a carrier 98 is not structured to have angled faces but instead has a curved lower face 100. Probes 102 are arranged along some or all of this curved face 100. In selecting a particular probe 102a for carrying out a scan, the tilt stage 16 is first driven so that the tip of the selected probe on the curved face 100 is oriented towards the sample. Separate, second addressing means is then activated to move the probe 102a out of the common plane. Finally, the carrier 98 is moved downwards so that the probe 102a is brought into proximity with the sample surface. In embodiments that include only a few, well spaced, probes, the second addressing means will not be necessary. The curve of the lower face 100 will be sufficient to keep unselected probes away from the sample surface to a reasonable manufacturing tolerance. For a closely-spaced high-concentration of probes, fabrication differences may be greater than the displacement due to angular separation and so an additional selection means will be required. That is, the use of two selection means may be preferable in order to relax fabrication tolerances on adjacent probes.

In still further embodiments of the invention the tilt stage 16 may be adapted to tilt about two axes that lie substantially parallel to the plane of the sample (x and y directions) or that project onto these sample reference directions. This enables a multi-faceted structure such as an inverted pyramid to be used as a carrier. Probes, of the same or different types, may be located on the faces of the structure. The carrier can then be tilted about two axes to enable any of its faces to align towards the sample surface. The probe, or one of the probes, mounted on that face may then be used in a scan. Alternatively, the carrier may be a spherical shape, with probes located around its surface, which can be oriented towards the sample by operation of the tilt stage.

All the embodiments of the invention described above enable automated replacement of a probe with another on the carrier. This probe exchange may be necessary to replace a worn probe or to carry out a further scan using a different probe. In either case however, the microscopy apparatus need only be realigned to a second probe on the same carrier for scanning to be continued. Time spent in realignment of the microscopy apparatus can be reduced further if each probe in the assembly has a known or measurable spatial relationship to every other probe. In attaching a cassette, which comprises the probe carrier, tilt stage and scanning mechanism along with an attachment mechanism, to the microscope, it is preferable first therefore to carry out the registration process, as described herein. This enables relative alignments of all probes within the cassette to be established. In fact, the registration process itself may be automated. Once the relative alignments of the probes are determined then alignment of one with the microscopy system will permit all to be similarly accurately aligned, again potentially using an automated process. For example, a complete cassette configuration may be provided with an identification code that relates the spatial position of each probe relative to that of all the other probes on the same cassette, the data being stored in a computer or other processor system. The computer is then adapted to control the microscope electronics, which enables computerised control of both the realignment of the detection system of the microscopy apparatus to a new probe as well as the selection of the new probe by connecting the selected probe to the power source. Moreover, if the order in which the probes replace one another is predetermined, automated realignment is possible without the need for individual probe identification codes.

The cassette itself ideally includes a cover and/or base that can be moved or removed to expose the probes to both the sample and the detection system, in preparation for use. For the case in which the housing includes a cover and a base, these can be moved or removed separately or together. The cover and/or base can be moved or removed prior to mounting or as part of the mounting process. However, it is preferable that the cover and/or base are moved or removed after the housing has been mounted, so that the housing remains closed to protect the probes during the mounting process.

In addition to protection, the cassette can also assist in alignment of the probe with the microscope system. The probe assembly may be accurately positioned within the cassette such that manual location of the cassette in a set position (which may be indicated by slots, grooves or the like) on the microscope system positions the assembly, at least approximately, ready for use.

In embodiments in which the cassette includes a memory chip containing registration details for the probes, the memory chip may also be used to monitor usage of each probe. Stored data is therefore updated as an individual probe is used. Such information may be exploited to limit probe usage, for example to a number of scans for which the probe is expected to function to a required specification.

As stated previously, the detection system of the microscopy apparatus may be used in aligning replacement probes: carrier position and tilt are adjusted until the signal received at the detection system is optimised. In another alternative, optical imaging of the probe may be used in combination with pattern recognition programming to align the detection system automatically with a new selected probe.

Turning now to the addressing means that is used to select one probe from a bank. A number of alternatives are known in the prior art and are suitable for use with this invention. All that is required is that they are operable to displace one probe within a bank or assembly from the common plane. For example, a lower electrode may be arranged beneath the sample with the probes on the probe assembly all being adapted to be selected to function as second electrodes. A probe is selected by applying a potential difference between the lower electrode, beneath the sample, and the selected probe. This generates an attractive force which urges the selected probe to bend towards the lower electrode and thus towards the sample. For some sample-types, it is possible that the sample itself may be employed as the lower electrode. Alternatively, both the lower electrode beneath the sample and an upper electrode above the probe assembly may be used. With this embodiment the lower electrode is electrically connected, across a power supply, to the upper electrode and enables an electromagnetic field to be established across the sample and the carrier. By applying an electrical potential to selected probes, by means of the individual electrical connections, one or more probes can be caused to move towards or away from the lower electrode and thus towards or away from the sample, in dependence upon the electrical potential applied thereto.

Further alternatives involve the use of remote addressing means. For example, for generating a pressure gradient with respect to selected probes, e.g. by blowing an inert gas or air on the selected probes, to cause the selected probes to deflect towards the specimen. In another example, the selection and hence movement of the individual probes towards or away from the sample may be achieved by heating a bi- (or more) layered region on each probe. Each layer is made of a material with different coefficients of thermal expansion. In this way, as the strip is heated, it will bend or deflect the cantilever beam, which in turn will move the probe. The layers may be metal, silicon or silicon nitride, or other materials that display the property of differing thermal expansivities. The advantage of silicon or silicon nitride is that these are common materials for probe fabrication and hence the probe itself may form one of the layers. Each bilayered region may be heated individually by means of light from, for example, a laser.

Other embodiments that make use of electrical activation include resistive heating of the above bilayered region. The upper and lower electrodes may be replaced by an electrically actuated substance, such as piezoelectric material, which is provided, individually, on each probe to enable the probes to be bent towards or away from the sample.

The invention claimed is:

1. A probe assembly for use with a scanning probe microscope, the assembly comprising a carrier supporting at least two probes, a scanning mechanism arranged to move the carrier in a predetermined scanning plane and a tilt stage arranged to tilt the carrier about an axis, wherein the carrier, scanning mechanism and tilt stage are arranged such that the tilt stage is not moveable by operation of the scanning mechanism, which is arranged to drive the carrier, wherein the tilt stage is operable to tilt the carrier about the axis such that one of the probes is oriented closer to a predetermined plane than the other, and wherein the carrier comprises multiple flat lower surfaces, each lower surface supporting at least one probe having a respective tip, and wherein the tilt stage is arranged to adjust the orientation of the carrier such that one of the flat lower surfaces is oriented towards the predetermined plane, such orientation being that which locates the tip or tips of the at least one probe on that surface closer to the predetermined plane.

2. A probe assembly according to claim 1, wherein the tilt stage is arranged to drive both the carrier and the scanning mechanism.

3. A probe assembly according to claim 1 wherein the assembly also includes addressing means arranged to select one of the probes by imparting additional movement towards the predetermined plane.

4. A probe assembly according to claim 1 wherein the at least two probes are at a known spatial location and with a known tilt angle required to bring them into alignment for carrying out a scan.

5. A method of studying a sample surface using a scanning probe microscope having a sample plate and a detection system, the method comprising the steps of:
- mounting a sample on the sample plate of the scanning probe microscope;
- mounting a probe assembly in the scanning probe microscope, the assembly comprising a carrier supporting at least two probes, a scanning mechanism arranged to move the carrier in a predetermined scanning plane and a tilt stage arranged to tilt the carrier about an axis, wherein the carrier, scanning mechanism and tilt stage are arranged such that the tilt stage is not moveable by operation of the scanning mechanism, which is arranged to drive the carrier;
- operating the tilt stage to orient the carrier such that a selected probe is oriented towards the sample;
- optionally addressing the selected probe to cause its tip to move out of a common plane relative to the remainder of the probes in its vicinity;
- positioning the selected probe over the sample surface;
- aligning the detection system of the scanning probe microscope with the one or more selected probes;
- generating relative movement between the selected probe and the sample surface; and
- monitoring the response of the one or more probes to its interaction with the sample using the detection system.

* * * * *